United States Patent [19]

Codatto

[11] Patent Number: 5,358,337
[45] Date of Patent: Oct. 25, 1994

[54] LOAD BEARING BALL
[75] Inventor: Antonio Codatto, Lonigo, Italy
[73] Assignee: Sapim Amada S.p.A., Turin, Italy
[21] Appl. No.: 29,452
[22] Filed: Mar. 11, 1993
[30] Foreign Application Priority Data Mar. 19, 1992 [IT] Italy .............................. VI92U000028

[51] Int. Cl.$^5$ ............................................. F16C 29/04
[52] U.S. Cl. ...................................... 384/41; 384/513;
193/35 MD
[58] Field of Search .................... 384/9, 49, 2, 41, 513;
193/35 MD

[56]     References Cited
U.S. PATENT DOCUMENTS 5,096,308  3/1992  Sundseth ................................ 384/49
5,129,058  6/1993  Sundseth ......................... 193/35 MD
5,219,057  6/1993  Sundseth ......................... 193/35 MD

*Primary Examiner*—Lenard A. Footland
*Attorney, Agent, or Firm*—Bucknam and Archer

[57]     ABSTRACT

The load bearing ball of the type which has a main ball (1) of substantially high diameter on which the loads rest, in turn rests on a plurality of balls (2) of diameter substantially smaller than the diameter of ball (1), which are placed on the bottom (3) of a suitable container (4), the latter having a substantially hemispheric shape. A main feature of the invention consists of the particular structure capable of closing the container and capable of holding the several balls in the interior of the container. This structure serves also for the purpose of fastening the main large ball to the border of the opening (6) formed on the supporting plane (7) of the same load bearing ball.

1 Claim, 2 Drawing Sheets

LOAD BEARING BALL

FIELD OF THE INVENTION

The present invention relates to a load bearing In several fields, when it is desirable to carry out the support of working planes and similar devices with rolling means for instance in punching presses, folding presses, shearing machines and similar devices, there are used devices called "load bearing balls" which comprise a main ball of relatively high diameter on which the loads rest. These balls in turn rest and roll on a plurality of balls of diameter substantially smaller with respect to the first ball, this plurality of balls being placed at the bottom of a suitable container which has an essentially hemispheric shape. Obviously there are provided means for closing the container and means for holding the several balls in place, means which obviously must be capable of avoiding the possibility that the balls come out from the same container.

The balls of smaller diameter are in general made of steel while the ball of greater diameter may also be made of steel but can be made of a plastic material and in particular of material of the anti-friction type such as teflon, nylon and similar material. On the contrary, the container mentioned hereinabove in general is made of a plate of pressed steel.

These devices permit to move the working planes and in general surfaces of a substantial weight in every direction, while avoiding the necessity of raising the same loads, an operation which was necessary to carry out prior to the time the device of the load bearing ball was introduced. In fact, it is clear that the loads may be lifted with great ease utilizing forces substantially lower with respect to the force which was necessary prior to the time the load bearing ball was introduced in commerce.

In all these applications, it is sufficient to insert the container in a suitable opening formed on the supporting plane, making sure obviously that the upper borders of the containers rest on the borders of the same opening. This type of application, however, is only possible in the case in which there is no danger that the structure may come out from the same border and, therefore, it is possible to operate only in the absence of particular vibrations and stresses directed upwardly because the load bearing ball remains in place due to the action of gravity.

A safer manner of mounting the container may be obtained by means of suitable rings, screws, toroidal rings or in general elastic structures connected to the container, all structures which make sure that the balls remain in place, also in the presence of vibrations of the type mentioned hereinabove. In every case, the elements of the structure which holds the balls must be added to the main elements which constitutes the main load bearing ball. This fact undoubtedly causes complications from the constructive point of view as well as the problems involving the mounting of the article and from the functional point of view depending on the different applications.

SUMMARY OF THE INVENTION

An object of the present invention is to provide a load bearing ball capable of avoiding the drawbacks mentioned hereinabove and a load bearing ball in particular in which all the holding elements of the load bearing ball in the receiving housing be made in the elements which constitute the main structure of the same load bearing ball.

The crux of the present invention resides in the fact that the load bearing ball is constructed as better described hereinbelow with reference to the accompanying drawings.

BRIEF DESCRIPTION OF THE DRAWINGS

FIG. 1 shows that the device according to the invention comprises in analogy to the known device a main ball (1) of relatively high diameter on which the loads must rest. This ball in turn rests and rolls on a plurality of balls (2) which have a diameter substantially smaller with respect to the first main ball, which balls (2) are located on the bottom (3) of a container (4) of essentially hemispheric shape. The border (5) of the mouth of the container rests on the border of an opening (6) formed on a plane of support (7). A fundamental characteristic of the device of the invention resides in the fact that the means capable of serving as the closing elements of the container and for holding in the interior of the container ball (1) and balls (2) consists of a ring (9) formed of elastic material placed corresponding to the mouth of the container.

As shown in FIG. 1, this ring surrounds the main ball (1) permitting the exit only in a very limited portion.

Figure 1:
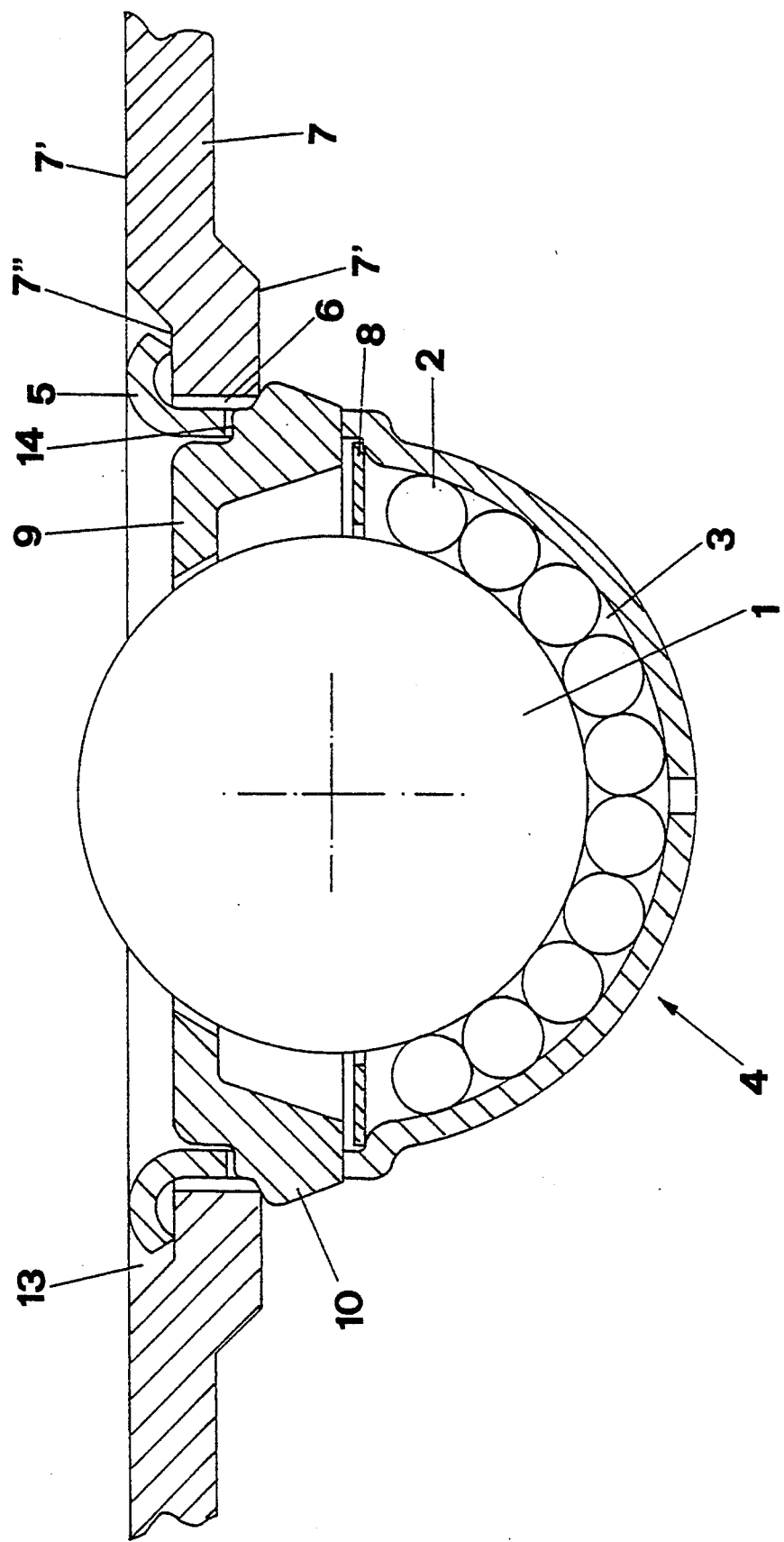
FIG. 1 illustrates a vertical cross section of the device of the present invention in the stage in which it is completely inserted in the container.

This ring (9) is provided laterally with two protrusions (10) which are capable of fastening to the border of the opening (6). However, this fastening must occur corresponding to the surface (7') which is opposite to the surface (7") and the container (4) rests on surface (7") corresponding to its border (5). The protrusions (10) exit from the container (4) through the slits (14) formed on the surface of the container. In the interior of the container, there is provided a ring (8) capable of avoiding the possibility that the balls (2) of smaller diameter come in contact with the internal balls (2) of smaller diameter come in contact with the internal surface of ring (9).

Figure 2:
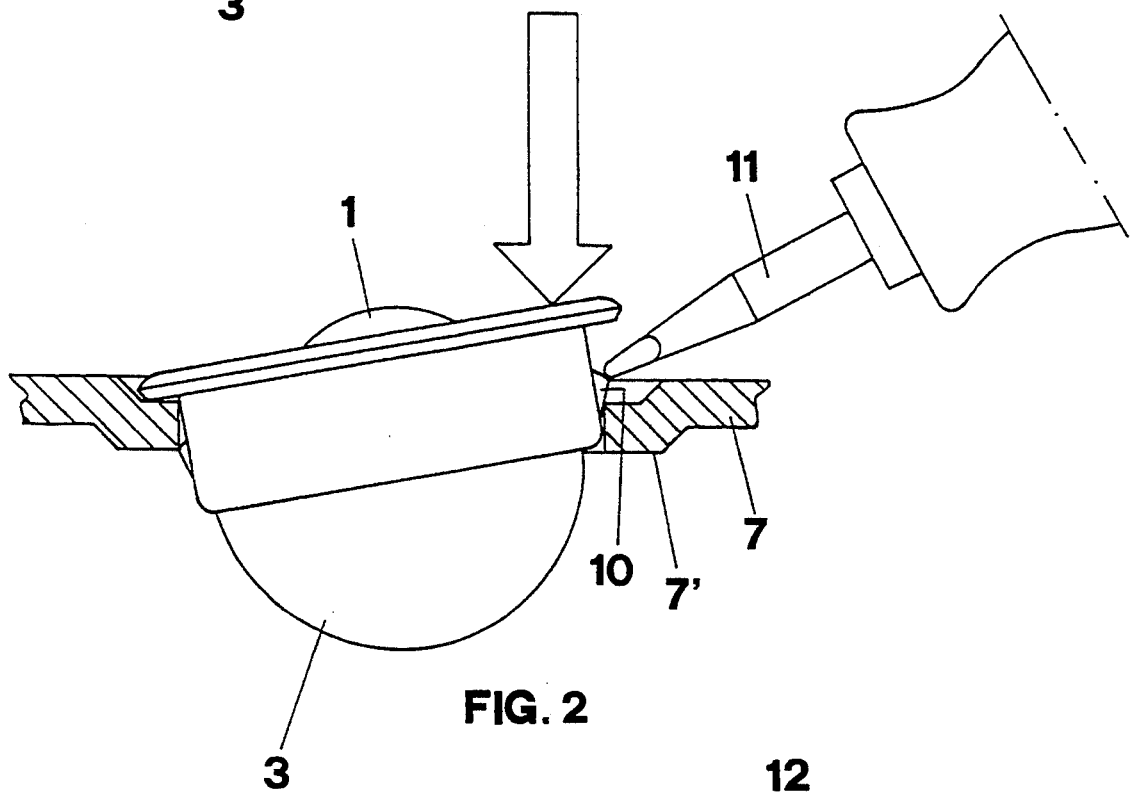
FIG. 2 illustrates the same device with the supporting plane in cross section during the mounting phase.

FIG. 2 shows that the step of mounting the main load bearing ball on the supporting plane (7) is extremely easy. In actual practice, it is sufficient with a suitable tool, for instance by means of screwdriver (11), pressing on the external surface of the protrusions (10) in a manner of pressing slightly towards the interior to permit the passage of the protrusions through the opening (6). Subsequently after the passage has been carried out, the same protrusions (10) due to their elasticity, return towards the exterior, and become disposed corresponding to the surface (7'). In this manner, they ensure the stable positioning of the ball (1) on the supporting plane (7) as shown in FIG. 3.

Figure 4:
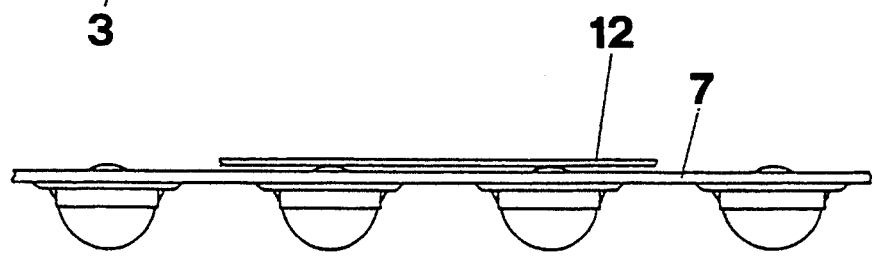
FIG. 4 illustrates a portion of a supporting plane which already has a plurality of balls according to the present invention in a phase of application.

FIG. 4 shows that after a plurality of balls is mounted on the supporting plane (7), they may act as the bearing structure for a load consisting for example of plate (12) as shown in the figure.

Figure 3:
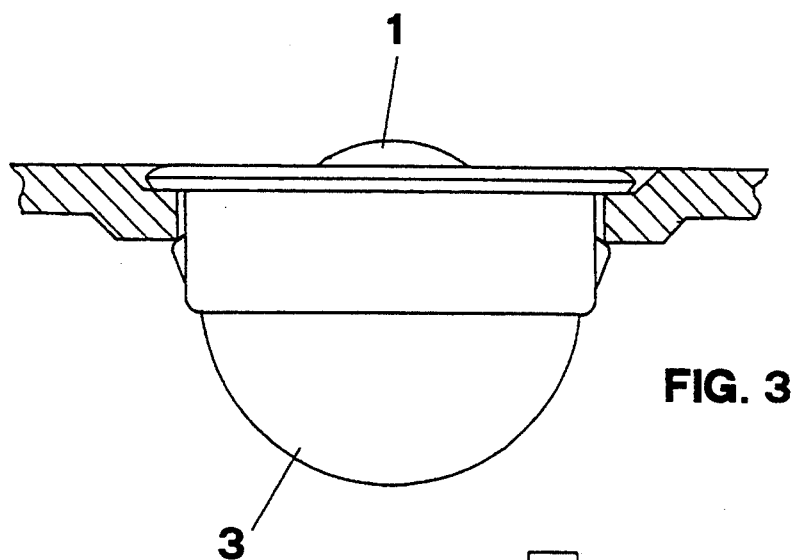
FIG. 3 illustrates the device of the invention after the mounting step has been completed.

FIGS. 1, 2 and 3 show that advantageously the load bearing balls may be placed on recesses (13) which are formed for instance by drilling on the supporting plane (7).

What is claimed is:

1. In a load bearing ball for supporting a working structure (7), said load bearing ball being of the type which comprises a first main ball (1) of great diameter on which the loads are intended to rest, said ball (1) in turn resting and rolling on a plurality of second balls (2) of a diameter substantially smaller with respect to the diameter of said first main ball (1), said plurality of balls (2) being located on the bottom (3) of a container (4), said container having a substantially hemispheric shape, means for closing said container and for holding said first main ball (1) and said plurality of second balls (2) in the interior thereof, the improvement which comprises said means for closing said container consisting of ring (9) of elastic material, said container having a mouth, said ring being placed corresponding to the mouth of said container, said ring (9) essentially surrounding said first main ball (1) whereby only a small portion of said first main ball (1) may exit from said container, said working structure (7) having an opening (6), said working structure (7) having a first surface (7') and a second surface (7''), said second surface (7'') being opposite said first surface (7'), said ring (9) having laterally at least two protrusions (10) capable of fastening along the border of said opening (6) formed on said working structure (7), corresponding to said first surface (7'), said container (4) resting on said second surface (7'').

* * * * *